(12) United States Patent
Han et al.

(10) Patent No.: US 12,061,369 B2
(45) Date of Patent: Aug. 13, 2024

(54) HEAT DISSIPATION STRUCTURE FOR OPTICAL MODULE AND COMMUNICATIONS DEVICE

(71) Applicant: Huawei Technologies Co., Ltd., Guangdong (CN)

(72) Inventors: Yunchao Han, Shanghai (CN); Dongjie Ai, Wuhan (CN); Jing Wang, Wuhan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 175 days.

(21) Appl. No.: 17/813,874

(22) Filed: Jul. 20, 2022

(65) Prior Publication Data

US 2022/0357537 A1 Nov. 10, 2022

Related U.S. Application Data

(63) Continuation of application No. PCT/CN2021/072697, filed on Jan. 19, 2021.

(30) Foreign Application Priority Data

Jan. 22, 2020 (CN) .......................... 202010075048.4

(51) Int. Cl.
*G02B 6/42* (2006.01)

(52) U.S. Cl.
CPC ......... *G02B 6/4272* (2013.01); *G02B 6/4269* (2013.01); *G02B 6/428* (2013.01)

(58) Field of Classification Search
CPC .. G02B 6/4206; G02B 6/4252; G02B 6/4257; G02B 6/426; G02B 6/4066;
(Continued)

(56) References Cited

U.S. PATENT DOCUMENTS

2003/0124903 A1* 7/2003 Inagaki ................ G02B 6/4277
439/502
2003/0161108 A1* 8/2003 Bright .................. G02B 6/4277
361/707

(Continued)

FOREIGN PATENT DOCUMENTS

CN 102612302 A 7/2012
CN 103811435 A 5/2014

(Continued)

*Primary Examiner* — Amir A Jalali
(74) *Attorney, Agent, or Firm* — WOMBLE BOND DICKINSON (US) LLP

(57) ABSTRACT

This application provides a heat dissipation structure for an optical module and a communications device, and relates to the field of optical communications technologies. The heat dissipation structure for the optical module includes: a panel with a jack; a PCB board, disposed on one side of the panel, where the PCB board is configured to install the optical module; and a heat conduction module, configured to conduct, to the panel, heat emitted from the optical module, where one end of the heat conduction module is in contact with the optical module, and the other end of the heat conduction module is in contact with the panel. In the heat dissipation structure for the optical module and the communications device, the panel is mainly used to dissipate heat from the optical module.

20 Claims, 6 Drawing Sheets

(58) Field of Classification Search
CPC .. G02B 6/4268; G02B 6/4269; G02B 6/4272; G02B 6/428; G02B 6/4281; G02B 6/4284; G02B 6/4448; G02B 6/4452; G02B 27/0012; H04B 10/40; H04B 10/501–503; H05K 7/20263; H05K 7/20281; H05K 7/2039; H05K 7/20436; H05K 7/20509; H05K 1/189; H05K 5/0026; H05K 5/03; H05K 2201/066; H05K 2201/10121; F25B 2321/023; F25B 2321/0251; F25B 2321/0252
See application file for complete search history.

(56) References Cited

U.S. PATENT DOCUMENTS

| 2007/0086720 | A1  |        | 4/2007  | Morris    |            |
|--------------|-----|--------|---------|-----------|------------|
| 2007/0133930 | A1  | *      | 6/2007  | Ishikawa  | G02B 6/4283 |
|              |     |        |         |           | 385/92     |
| 2008/0137306 | A1  | *      | 6/2008  | Kim       | H05K 9/0058 |
|              |     |        |         |           | 361/752    |
| 2009/0296351 | A1  | *      | 12/2009 | Oki       | G02B 6/4246 |
|              |     |        |         |           | 361/709    |
| 2012/0207427 | A1  | *      | 8/2012  | Ito       | G02B 6/4261 |
|              |     |        |         |           | 385/14     |
| 2014/0147127 | A1  | *      | 5/2014  | McColloch | H01S 5/02469 |
|              |     |        |         |           | 398/135    |
| 2017/0075083 | A1  |        | 3/2017  | Moore et al. |         |
| 2017/0150645 | A1  | *      | 5/2017  | Huang     | H05K 5/0026 |
| 2019/0384021 | A1  | *      | 12/2019 | Suzuki    | G02B 6/3839 |

FOREIGN PATENT DOCUMENTS

| CN | 204335274 U | 5/2015  |
| CN | 204887856 U | 12/2015 |
| CN | 105307450 A | 2/2016  |
| CN | 107191816 A | 9/2017  |
| CN | 110161638 A | 8/2019  |
| CN | 110333582 A | 10/2019 |

* cited by examiner

HEAT DISSIPATION STRUCTURE FOR OPTICAL MODULE AND COMMUNICATIONS DEVICE

CROSS-REFERENCE TO RELATED APPLICATIONS

This application is a continuation of International Patent Application No. PCT/CN2021/072697, filed on Jan. 19, 2021, which claims priority to Chinese Patent Application No. 202010075048.4, filed on Jan. 22, 2020. The disclosures of the aforementioned applications are hereby incorporated by reference in their entireties.

TECHNICAL FIELD

This application relates to the field of optical communications technologies, and in particular, to a heat dissipation structure for an optical module and a communications device.

BACKGROUND

FIG. 1 shows a communications device in the conventional technology. As shown in FIG. 1, a PCB board 02 and a panel 01 are relatively fixed, an optical cage 04 is disposed on the PCB board 02, and an optical module 03 passes through a jack of the panel 01 to be disposed in the optical cage 04.

In the conventional technology, a heat dissipation hole 011 is disposed on the panel 01. To be specific, air convection is generated by using the heat dissipation hole 011, to dissipate heat from the optical module. A heat dissipation effect in the heat dissipation manner is relatively poor, and a temperature gain of the optical module is usually only about 2° C. Therefore, design of a heat dissipation structure for an optical module is still a technical problem to be breakthrough in the field.

SUMMARY

Embodiments of this application provide a heat dissipation structure for an optical module and a communications device, to resolve a problem of a poor heat dissipation effect in the conventional technology.

According to a first aspect, this application provides a heat dissipation structure for an optical module, including: a panel with a jack; a PCB board, disposed on one side of the panel, where the PCB board is configured to install the optical module; and a heat conduction module, configured to conduct, to the panel, heat emitted from the optical module, where one end of the heat conduction module is in contact with the optical module, and the other end of the heat conduction module is in contact with the panel.

According to the heat dissipation structure for the optical module provided in this embodiment of this application, heat emitted from the optical module is conducted to the panel by using the heat conduction module, that is, heat is directly dissipated by using the existing panel, thereby fully using the panel in the existing structure. In various embodiments, only the heat conduction module needs to be disposed to conduct heat to the panel, and a dedicated heat dissipating device does not need to be disposed. Compared with the conventional technology, this application uses heat dissipation through heat conduction rather than heat dissipation through air flowing. Compared with existing heat dissipation through air flowing, heat dissipation through heat conduction greatly improves an effect of heat dissipation on the optical module.

In an embodiment of the first aspect, the panel has a plug-in section and an edge folding section connected to the plug-in section, and the jack is disposed on the plug-in section. The edge folding section is located on a first side of the plug-in section, the PCB board is located on a second side of the plug-in section, and the first side is opposite to the second side. One end of the heat conduction module is in contact with the edge folding section, and the other end of the heat conduction module is in contact with a part that is of the optical module and that is located on the first side. The panel has a structure, that is, the panel has the plug-in section and the edge folding section connected to an end of the plug-in section, and the edge folding section and the PCB board are disposed opposite to each other on both sides of the plug-in section. In this way, one end of the heat conduction module can be in contact with the edge folding section, and the other end can be in contact with the part that is of the optical module and that is located on the first side, to conduct heat in a head of the optical module to the edge folding section. Heat is dissipated from the head of the optical module by using the edge folding section, so that thermal resistance of a heat transfer path in the head of the optical module is reduced, thereby improving heat dissipation efficiency.

In an embodiment of the first aspect, the panel has a plug-in section and an edge folding section connected to the plug-in section, and the jack is disposed on the plug-in section. The edge folding section and the PCB board are located on a same side of the plug-in section. One end of the heat conduction module is in contact with the edge folding section, and the other end of the heat conduction module is in contact with a part that is of the optical module and that is located on a same side as the edge folding section. The panel has another structure, that is, the panel has the plug-in section and the edge folding section connected to an end of the plug-in section, and the edge folding section and the PCB board are located on a same side of the plug-in section. In this way, one end of the heat conduction module can be in contact with the edge folding section, and the other end can be in contact with the middle of the optical module, to transfer heat in the middle of the optical module to the edge folding section. Heat is dissipated from the middle of the optical module by using the edge folding section, so that thermal resistance of a heat transfer path in the middle of the optical module is reduced, thereby improving heat dissipation efficiency.

In an embodiment of the first aspect, a surface that is of the optical module and that is opposite to the edge folding section is a heat conduction surface, and the heat conduction module is disposed between the heat conduction surface and the edge folding section. Because a relatively large amount of heat is emitted from the surface that is of the optical module and that is opposite to the edge folding section, the surface is used as the heat conduction surface, and the heat conduction module is disposed between the heat conduction surface and the edge folding section. In this way, thermal resistance of a heat transfer path is further reduced, thereby improving heat dissipation efficiency.

In an embodiment of the first aspect, the heat conduction module is connected to the edge folding section and can float in a first direction, where the first direction is a direction perpendicular to a plug-in direction of the optical module. When the optical module is plugged in the plug-in direction of the optical module, there may be a tolerance in the first direction perpendicular to the plug-in direction. The heat conduction module is enabled to float in the first direction, so that even if there is the tolerance in the first direction when the optical module is plugged in, the heat conduction module floats relative to the optical module in the first direction, to ensure that the optical module is smoothly plugged in and is not interfered with by the heat conduction module.

In an embodiment of the first aspect, the heat conduction module includes an elastic heat conduction pad, and floats in the first direction by using elasticity of the elastic heat conduction pad, to ensure smooth plug-in of the optical module. This is also convenient to implement.

In an embodiment of the first aspect, the heat conduction module further includes: a heat conduction block, where the elastic heat conduction pad is disposed on a side that is of the heat conduction block and that is close to the optical module, and/or is disposed on a side that is of the heat conduction block and that is close to the edge folding section; and a connecting piece, where the heat conduction block and the elastic heat conduction pad are connected to the edge folding section by using the connecting piece. The heat conduction block with a rigid structure is disposed, so that on the premise that the heat conduction module can float in the first direction, a heat conduction effect can be further improved by using the heat conduction block, and strength of the entire heat conduction module can be improved.

In an embodiment of the first aspect, the heat conduction module includes: a heat conduction block, where the heat conduction block has a rigid structure; and an elastic component, where the heat conduction block is connected to the edge folding section by using the elastic component, and the elastic component is configured to apply elastic force to the heat conduction block, so that the heat conduction block floats in the first direction. The elastic component is used to enable the heat conduction block with a rigid structure to float in the first direction, so that a structure is simple and is convenient to implement.

In an embodiment of the first aspect, the heat conduction module includes a first heat conduction block and a second heat conduction block, both the first heat conduction block and the second heat conduction block have a rigid structure, and the second heat conduction block may slide relative to the first heat conduction block in the first direction. When the optical module is plugged in the plug-in direction of the optical module and there is a tolerance, the second heat conduction block may slide relative to the first heat conduction block in the first direction, to ensure smooth plug-in of the optical module.

In an embodiment of the first aspect, an auxiliary heat dissipation component is further disposed on the panel, and the auxiliary heat dissipation component is configured to diffuse heat conducted to the panel. The auxiliary heat dissipation component disposed on the panel is used to diffuse heat conducted to the panel as soon as possible, thereby improving heat dissipation efficiency.

In an embodiment of the first aspect, the auxiliary heat dissipation component includes a heat pipe, where the heat pipe has an evaporating end and a condensing end that are opposite to each other and is disposed in the panel, the evaporating end is close to the heat conduction module, and the condensing end is far away from the heat conduction module. The heat pipe is disposed in the panel, which does not reduce strength of the panel, and can further improve heat dissipation efficiency.

In an embodiment of the first aspect, the auxiliary heat dissipation component includes a heat dissipation hole disposed on the panel. The heat dissipation hole is disposed to form air flowing, thereby improving heat dissipation efficiency.

In an embodiment of the first aspect, the heat dissipation structure further includes: a heat dissipating device, configured to diffuse heat emitted from the optical module, where the heat dissipating device and the PCB board are located on a same side. The heat dissipating device is used to diffuse heat emitted from the optical module, and the heat conduction module further conducts, to the panel, the heat emitted from the optical module, to implement multi-directional heat dissipation on the optical module, thereby ensuring use performance of the optical module.

In an embodiment of the first aspect, the heat dissipating device includes a heat dissipation fin and a second heat conduction module, where one end of the second heat conduction module is in contact with the optical module, and the other end is connected to the heat dissipation fin. The second heat conduction module in contact with the optical module is disposed to conduct, to the heat dissipation fin, heat emitted from the optical module, and the heat is dissipated by using the heat dissipation fin, so that a structure is simple and is also convenient to implement.

In an embodiment of the first aspect, the heat dissipation fin is disposed on a side that is of the optical module and that is away from the plug-in section, that is, located on the outside of an electrical interface end of the optical module. In this way, a height size of the entire panel is not increased.

According to a second aspect, this application further provides a communications device, including: the heat dissipation structure for the optical module in the foregoing technical solution, the optical module, and a socket. The socket is disposed on the PCB board, and the optical module passes through the jack to be plugged into the socket.

The communications device provided in this embodiment of this application includes the heat dissipation structure for the optical module in any of the foregoing technical solutions, heat emitted from the optical module is conducted to the existing panel by using the heat conduction module, and the heat is dissipated by using the panel. Therefore, the existing panel is fully used, and a dedicated heat dissipating device does not need to be disposed. Compared with the conventional technology, this application uses heat dissipation through heat conduction rather than heat dissipation through air flowing. Compared with existing heat dissipation through air flowing, heat dissipation through heat conduction greatly improves an effect of heat dissipation on the optical module.

REFERENCE NUMERALS

01—panel; 011—heat dissipation hole; 02—PCB board; 03—optical module; 04—optical cage; 1—panel; 101—plug-in section; 102—edge folding section; 2—PCB board; 31—optical module; 31A—head of the optical module; 31B—middle of the optical module; 31C—tail of the optical module; 32—optical cage; 33—socket; 4—heat conduction module; 41—elastic heat conduction pad; 42—heat conduction block; 421—inlaid groove; 43—connecting piece; 44—elastic component; 45—guide post; 46—first heat conduction block; 47—second heat conduction block; 5—heat pipe; 6—heat dissipating device; 61—second heat conduction module; 62—heat dissipation fin; and 7—protection board.

DESCRIPTION OF EMBODIMENTS

Embodiments of this application relate to a heat dissipation structure for an optical module and a communications device. The following describes the heat dissipation structure for the optical module and the communications device in detail with reference to the accompanying drawings.

An optical module is an important component in the optical communications field, and the optical module includes an electrical interface and an optical interface. The electrical interface is configured to cooperate with a socket on a PCB board in a communications device to implement plug-in, and the optical interface is configured to connect to a fiber. The optical module can convert an electrical signal input from the electrical interface into an optical signal to be output from the optical interface; or convert an optical signal input from the optical interface into an electrical signal to be output from the electrical interface; or convert an electrical signal input from the electrical interface into an optical signal to be output from the optical interface, and at the same time, convert an optical signal input from the optical interface into an electrical signal to be output from the electrical interface.

Figure 1:
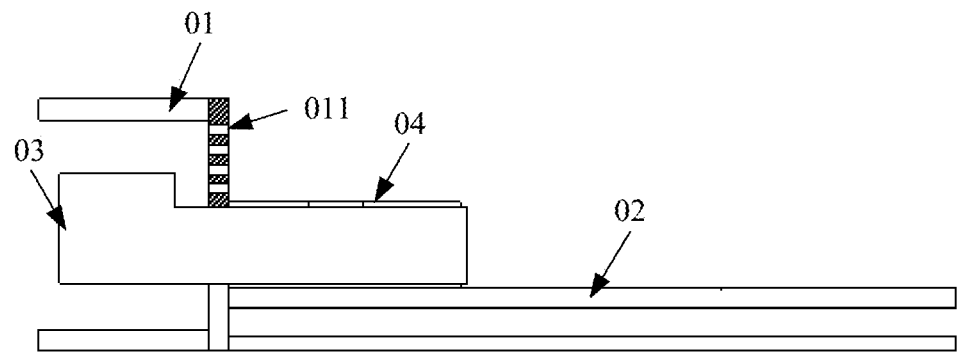
FIG. 1 is a schematic diagram of a structure of a communications device in the conventional technology.
Figure 2:
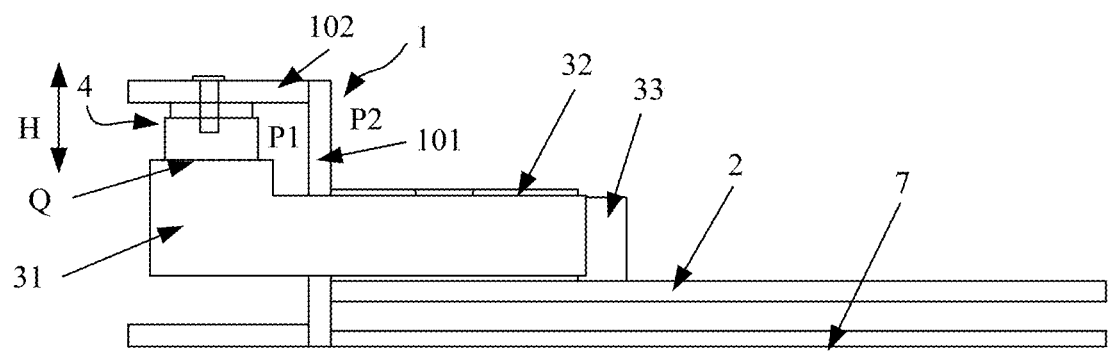
FIG. 2 is a schematic diagram of a structure of a communications device according to some embodiments of this application.

FIG. 2 is a schematic diagram of a structure of a communications device according to some embodiments of this application. The communications device includes: a panel 1 with a jack, and a PCB board 2 disposed on one side of the panel 1. An optical module 31 passes through the jack to be disposed on the PCB board 2. An optical cage 32 and a socket 33 configured to be plugged into the optical module 31 are disposed on the PCB board 2. The optical module 31 passes through the jack to be inserted into the optical cage 32 and plugged into the socket 33.

In addition, the communications device may further include a protection board 7. The protection board 7 is connected to the panel 1, and the protection board 7 is configured to protect the PCB board 2 and an element on the PCB board 2. The PCB board 2 may be connected to the protection board 7, or may be connected to the panel 1, for example, connected by using a connecting piece (a bolt, a rivet, or the like).

To dissipate heat from the optical module 31, an embodiment of this application provides a heat dissipation structure for dissipating heat from an optical module. As shown in FIG. 2, the heat dissipation structure includes a heat conduction module 4 configured to conduct, to the panel 1, heat emitted from the optical module 31. A specific heat dissipation principle is as follows: Heat emitted from the optical module 31 is conducted to the panel 1 by using the heat conduction module 4, and the heat is dissipated by using the panel 1. In other words, in this embodiment provided in this application, the existing panel 1 is used as a heat dissipating device to dissipate heat from the optical module 31.

A technical effect generated by using the panel 1 as the heat dissipating device in this embodiment of this application is as follows: Heat is conducted to the panel 1 by using the heat conduction module 4 for heat dissipation, to better dissipate heat from the optical module. In other words, compared with existing heat dissipation through air flowing, heat dissipation through heat conduction used in this application effectively improves a heat dissipation effect.

Figure 3:
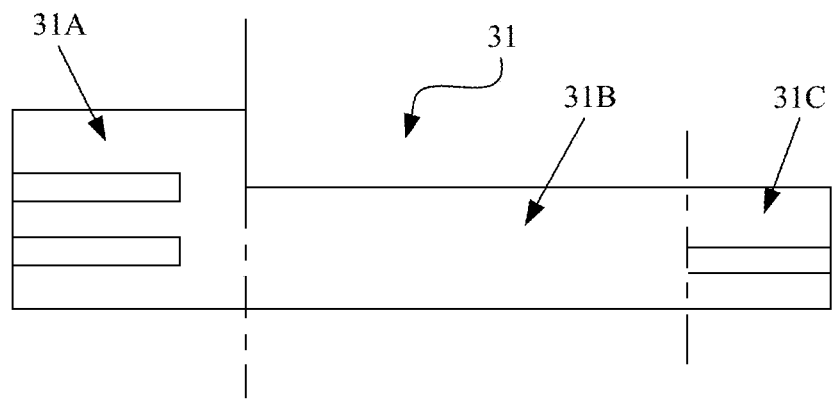
FIG. 3 is a schematic diagram of a structure of an optical module.

As shown in a schematic diagram of the optical module 31 in FIG. 3, generally, an end with an optical interface is referred to as a head 31A of the optical module, and an end with an electrical interface is referred to as a tail 31C of the optical module. A part located between the head 31A of the optical module and the tail 31C of the optical module is the middle 31B of the optical module.

In various embodiments, the panel 1 is used to dissipate heat from the optical module 31. The following explains two embodiments.

Embodiment 1: As shown in FIG. 2, the panel 1 has a plug-in section 101 and an edge folding section 102 connected to the plug-in section 101. The jack is disposed on the plug-in section 101. The edge folding section 102 is located on a first side (a P1 side shown in FIG. 2) of the plug-in section 101, the PCB board 2 is located on a second side (a P2 side shown in FIG. 2) of the plug-in section 101, and the first side is opposite to the second side. One end of the heat conduction module 4 is in contact with the edge folding section 102, and the other end of the heat conduction module 4 is in contact with a part that is of the optical module 31 and that is located on the first side.

If the optical module 31 is an optical module with the structure as shown in FIG. 3, one end of the heat conduction module 4 is in contact with the edge folding section 102, and the other end of the heat conduction module 4 is in contact with the head of the optical module 31. Therefore, heat emitted from the head of the optical module 31 can be conducted to the edge folding section 102 of the panel 1 by using the heat conduction module 4. Certainly, the optical module 31 in this application may have another structure.

For example, an optical interface end and an electrical interface end of the optical module are located on a same side.

Figure 4:
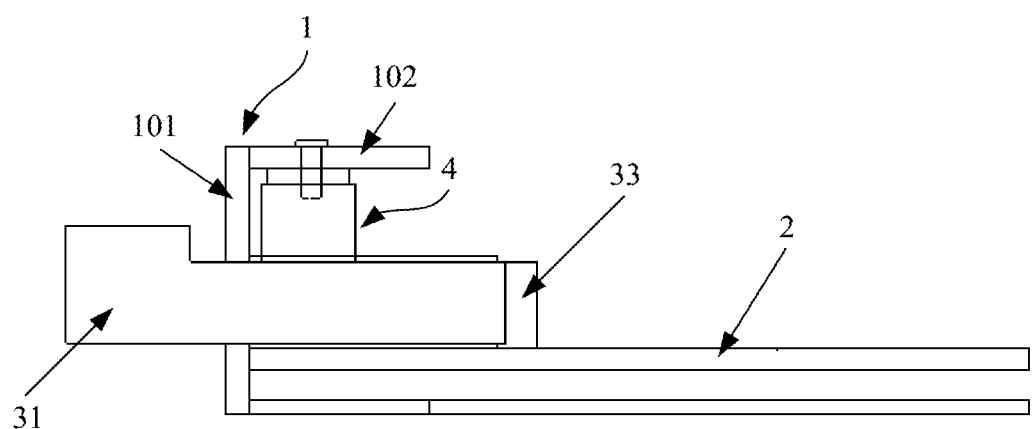
FIG. 4 is a schematic diagram of a structure of a communications device according to some embodiments of this application.

Embodiment 2: As shown in FIG. 4, the panel 1 has a plug-in section 101 and an edge folding section 102 connected to the plug-in section 101. The jack is disposed on the plug-in section 101. The edge folding section 102 and the PCB board 2 are located on a same side of the plug-in section 101. One end of the heat conduction module 4 is in contact with the edge folding section 102, and the other end is in contact with a part that is of the optical module 31 and that is located on a same side as the edge folding section 102.

If the optical module 31 is an optical module with the structure as shown in FIG. 3, one end of the heat conduction module 4 is in contact with the edge folding section 102, and the other end of the heat conduction module 4 is in contact with the middle of the optical module 31. Therefore, heat emitted from the middle of the optical module 31 can be conducted to the edge folding section 102 of the panel 1 by using the heat conduction module 4. It is found through a test that, when the communications device runs, heat emitted from the head 31A of the optical module and the middle 31B of the optical module is relatively high. Therefore, an effect of heat dissipation on the optical module can be improved by using the foregoing two embodiments.

Heat emitted from a surface that is of the optical module 31 and that is opposite to the edge folding section 102 and heat emitted from a surface opposite to the surface are usually higher than heat emitted from another location. To improve a heat dissipation effect, the surface that is of the optical module and that is opposite to the edge folding section is used as a heat conduction surface (a Q surface shown in FIG. 2), and the heat conduction module 4 is disposed between the heat conduction surface and the edge folding section 102. In this way, efficiency of conducting heat on the optical module 31 to the heat conduction module 4 can be improved to rapidly cool the optical module 31, and space between the heat conduction surface and the edge folding section 102 can be fully used.

After heat emitted from the optical module 31 is conducted to the panel 1 by using the heat conduction module 4, to rapidly diffuse the heat on the panel 1, the heat dissipation structure further includes an auxiliary heat dissipation component, where the auxiliary heat dissipation component is configured to diffuse heat conducted to the panel 1. In this way, efficiency of heat dissipation on the optical module is improved.

The auxiliary heat dissipation component has a plurality of implementable structures. The following describes a structure of the auxiliary heat dissipation component by using two embodiments.

Figure 5:
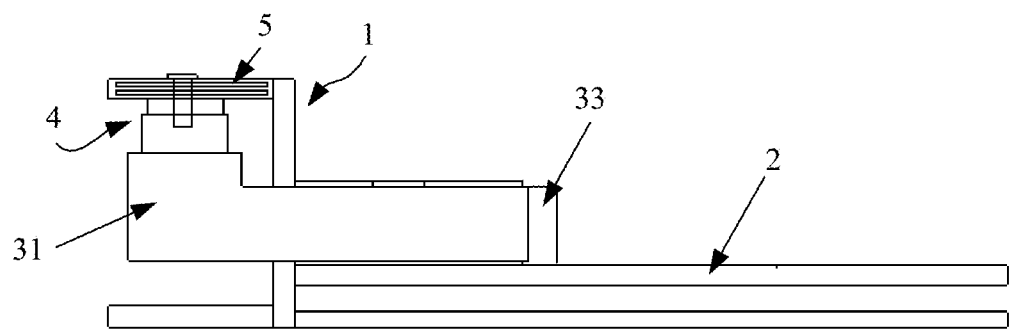
FIG. 5 is a schematic diagram of a structure of a communications device according to some embodiments of this application.

Embodiment 1: As shown in FIG. 5, the auxiliary heat dissipation component includes a heat pipe 5. The heat pipe 5 has an evaporating end and a condensing end that are opposite to each other. The heat pipe 5 is disposed in the panel 1, the evaporating end is close to the heat conduction module 4, and the condensing end is far away from the heat conduction module 4.

The heat pipe 5 usually includes a pipe housing, a capillary wick, and an end cover. The inside of the heat pipe 5 is pumped a negative pressure state and is filled with proper liquid. The liquid has a low boiling point and is easy to volatilize. The capillary wick is on a pipe wall and is made of a capillary porous material. When the evaporating end of the heat pipe 5 is heated, liquid in a capillary pipe evaporates rapidly, and vapor flows to the condensing end under a small pressure difference, releases heat, and condenses into liquid again. The liquid flows back to the evaporating end along the porous material under action of capillary force. This circulates endlessly. Because the circulation occurs rapidly, heat can be incessantly conducted to the outside. Therefore, heat is effectively diffused when the heat pipe 5 disposed in the panel 1 is used, thereby preventing heat from accumulating at a location that is on the panel 1 and that is close to the optical module 31, to avoid impact on an effect of heat dissipation on the optical module 31.

A quantity of heat pipes may be determined based on an amount of heat emitted from the optical module. For example, when a relatively large amount of heat is emitted from the optical module, a plurality of heat pipes arranged in parallel may be used.

Embodiment 2: The auxiliary heat dissipation component includes a heat dissipation hole disposed on the panel 1. To be specific, heat conducted to the panel 1 is diffused by using the heat dissipation hole.

Compared with Embodiment 2, Embodiment 1 has the following advantages: Heat diffusion efficiency is high, and strength of the panel is not reduced, to avoid impact on use performance of the panel. Therefore, in this application, the heat pipe 5 disposed in the panel 1 is preferably used as the auxiliary heat dissipation component. Certainly, another structure also falls within the protection scope of this application.

The heat conduction module 4 is connected to the edge folding section 102 in a plurality of manners, for example, a fixed connection, to be specific, the heat conduction module 4 and the edge folding section 102 are relatively fixed in a first direction; for another example, a movable connection, to be specific, the heat conduction module 4 and the edge folding section 102 can relatively float in the first direction.

It should be noted that all first directions in this application are a direction H shown in FIG. 2, that is, a direction perpendicular to a plug-in direction of the optical module 31.

In various embodiments, when the optical module 31 is plugged in the plug-in direction of the optical module 31, there is usually a tolerance in the first direction. If the heat conduction module 4 and the edge folding section 102 are relatively fixed in the first direction, the optical module 31 cannot be smoothly inserted into the optical cage 32. Therefore, this embodiment of this application provides that the heat conduction module 4 and the edge folding section 102 can relatively float in the first direction.

The heat conduction module 4 floats in the first direction in a plurality of structures. The following explains a structure of the heat conduction module 4 by using three examples.

Figure 6:
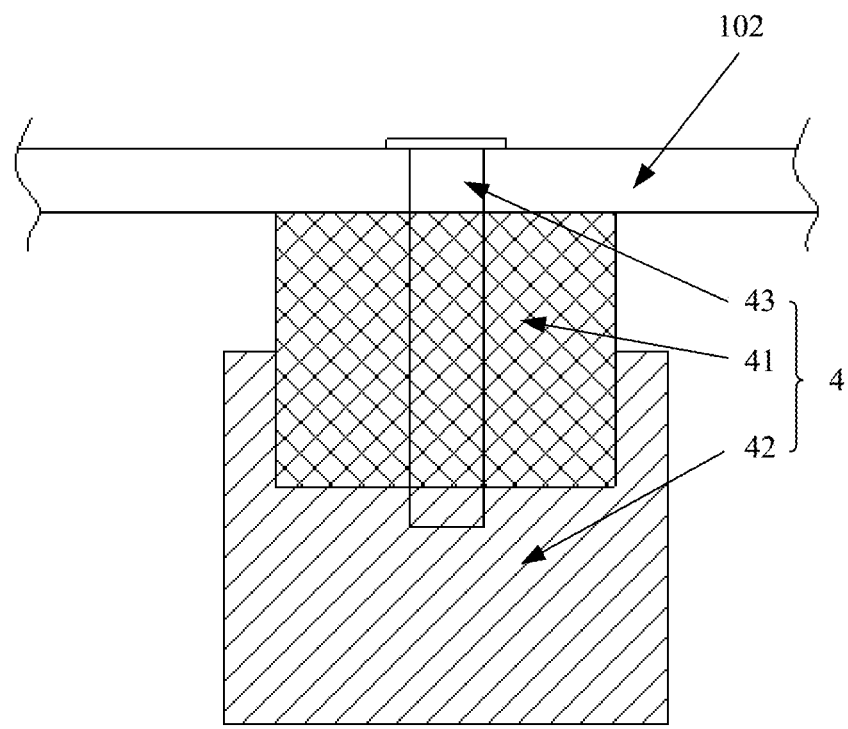
FIG. 6 is a schematic diagram of a connection relationship between a heat conduction module and an edge folding section according to some embodiments of this application.
Figure 8:
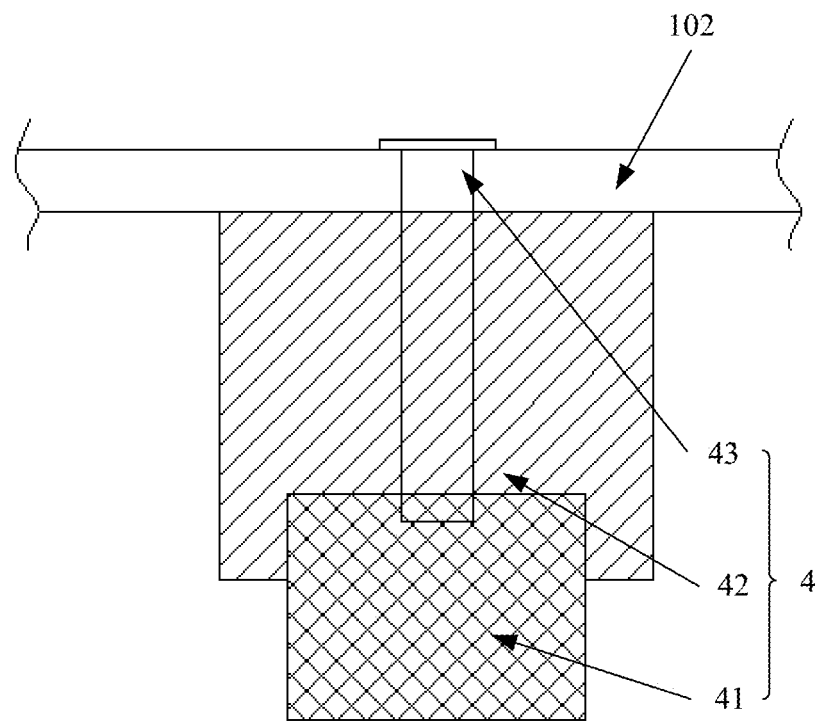
FIG. 8 is a schematic diagram of a connection relationship between a heat conduction module and an edge folding section according to some embodiments of this application.

Embodiment 1: As shown in FIG. 6 and FIG. 8, the heat conduction module 4 includes an elastic heat conduction pad 41. To be specific, the heat conduction module 4 floats in the first direction by using the elastic heat conduction pad 41 that has elasticity. In addition, the elastic heat conduction pad 41 can ensure a heat conduction effect. In various embodiments, the elastic heat conduction pad 41 may be bonded to the edge folding section 102 by using a bonding structure, or may be connected to the edge folding section 102 by using a connecting piece. Certainly, the elastic heat conduction pad 41 may be connected to the edge folding section 102 by using another connecting structure. Specifically, an elastic heat conduction component such as heat conduction graphene may be used as the heat conduction module.

Figure 9:
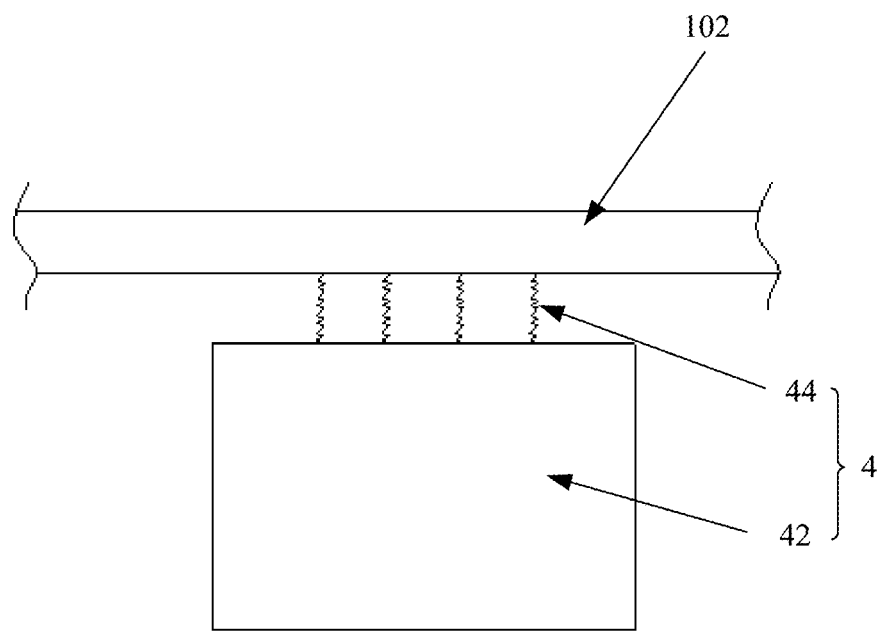
FIG. 9 is a schematic diagram of a connection relationship between a heat conduction module and an edge folding section according to some embodiments of this application.

Embodiment 2: As shown in FIG. 9, the heat conduction module 4 includes a heat conduction block 42 with a rigid structure and an elastic component 44. The heat conduction block 42 is connected to the edge folding section 102 by using the elastic component 44, and the elastic component 44 is configured to apply elastic force to the heat conduction block 42, so that the heat conduction block 42 floats in the first direction. In other words, the elastic component 44 drives the heat conduction block 42 with a rigid structure to float in the first direction. Specifically, the heat conduction block 42 may be an aluminum plate, a copper plate, or an iron plate, or another metal plate, or another heat conduction material with rigidity.

Figure 11:
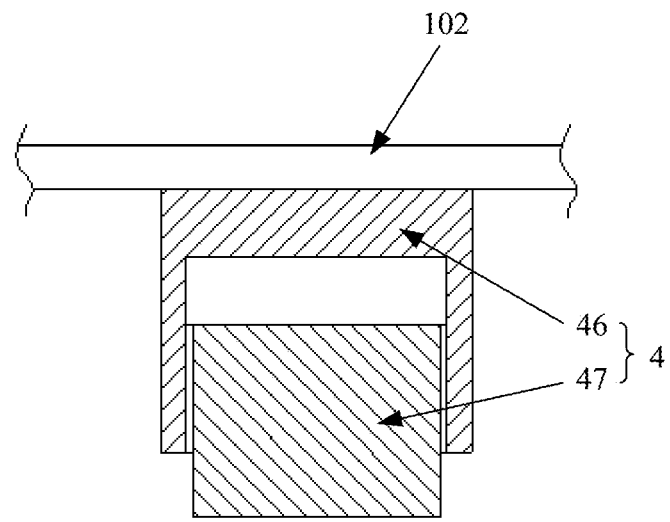
FIG. 11 is a schematic diagram of a connection relationship between a heat conduction module and an edge folding section according to some embodiments of this application.

Embodiment 3: As shown in FIG. 11, the heat conduction module 4 includes a first heat conduction block 46 and a second heat conduction block 47. Both the first heat conduction block 46 and the second heat conduction block 47 have a rigid structure, and the second heat conduction block 47 may slide relative to the first heat conduction block 46 in the first direction. In other words, the second heat conduction block 47 slides in the first direction, so that the entire heat conduction module 4 floats in the first direction. Specifically, the first heat conduction block 46 and the second heat conduction block 47 each may be an aluminum plate, a copper plate, or an iron plate, or another metal plate, or another heat conduction material with rigidity.

When the elastic heat conduction pad shown in FIG. 6 is used as the heat conduction module, compared with the heat conduction block made of a rigid material, the elastic heat conduction pad has a smaller coefficient of heat conductivity, and consequently has lower heat conduction efficiency. To improve heat conduction efficiency, as shown in FIG. 6 and FIG. 8, the heat conduction module 4 further includes the heat conduction block 42 with a rigid structure, and the elastic heat conduction pad 41 and the heat conduction block 42 are connected to the edge folding section 102 by using a connecting piece 43. In this way, the following technical effects are achieved: Heat conduction efficiency is improved, and the heat conduction block 42 with a rigid structure can improve strength of the entire heat conduction module 4, and therefore is applicable to different environments and even a bad use environment, to improve use performance. Therefore, the heat conduction module formed by combining the heat conduction block and the elastic heat conduction pad is preferably used in this application.

The heat conduction block 42 and the elastic heat conduction pad 41 can be connected in a plurality of manners. The following describes a structure of the connection by using three embodiments.

Embodiment 1: As shown in FIG. 6, the elastic heat conduction pad 41 is disposed on a side that is of the heat conduction block 42 and that is close to the edge folding section 102. In other words, the elastic heat conduction pad 41 is disposed between the edge folding section 102 and the heat conduction block 42. In this way, when heat is dissipated from the optical module 31, the heat conduction block 42 is directly in contact with the optical module 31.

Embodiment 2: As shown in FIG. 8, the heat conduction block 42 is disposed on a side that is of the elastic heat conduction pad 41 and that is close to the edge folding section 102. In other words, the heat conduction block 42 is disposed between the elastic heat conduction pad 41 and the edge folding section 102. In this way, when heat is dissipated from the optical module 31, the elastic heat conduction pad 41 is directly in contact with the optical module 31.

Embodiment 3: The elastic heat conduction pad 41 is disposed on both a side that is of the heat conduction block 42 and that is close to the edge folding section 102 and a side that is of the heat conduction block 42 and that is close to the optical module 31.

In the foregoing three embodiments, regardless of whether the heat conduction block 42 is in contact with the edge folding section 102 or the heat conduction block 42 is in contact with the optical module 31, to improve heat conduction efficiency, the heat conduction block 42 is in surface contact with a structure in contact with the heat conduction block 42. Compared with discrete point contact, heat conduction efficiency can be effectively improved.

Similarly, regardless of whether the elastic heat conduction pad 41 is in contact with the edge folding section 102 or the elastic heat conduction pad 41 is in contact with the optical module 31, to improve heat conduction efficiency, the elastic heat conduction pad 41 is in surface contact with a structure in contact with the elastic heat conduction pad 41. Compared with discrete point contact, heat conduction efficiency can be effectively improved.

To further improve heat conduction efficiency, flatness of a contact surface between the foregoing components is as small as possible and roughness of the contact surface is also as small as possible. For example, the flatness is less than or equal to 0.05, and the roughness is less than or equal to 3.2, to reduce thermal resistance between contact surfaces and improve heat conduction efficiency.

Figure 7:
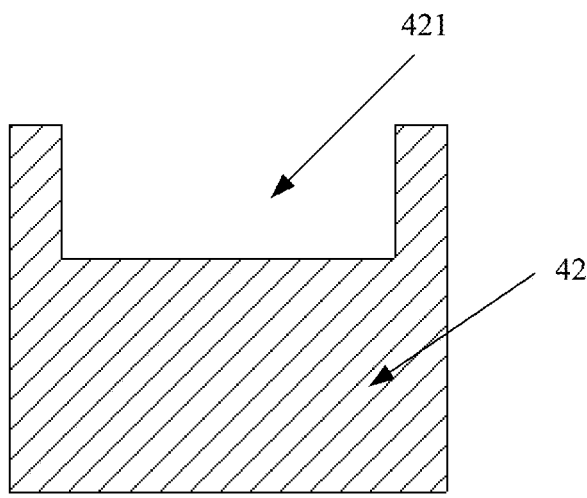
FIG. 7 is a schematic diagram of a structure of a heat conduction block according to some embodiments of this application.

When the heat conduction block 42 is connected to the elastic heat conduction pad 41, the heat conduction block 42 is connected to the elastic heat conduction pad 41 in a plurality of manners. For example, as shown in FIG. 7, an inlaid groove 421 may be disposed on a side surface that is of the heat conduction block 42 and that is configured to dispose the elastic heat conduction pad 41. As shown in FIG. 6 and FIG. 8, a part of the elastic heat conduction pad 41 is disposed in the inlaid groove 421. For another example, the heat conduction block 42 is connected to the elastic heat conduction pad 41 by using a connecting piece, for example, a bolt, a screw, or another connecting piece.

When the heat conduction block 42 and the elastic component 44 shown in FIG. 9 are used as the heat conduction module 4, the elastic component 44 can be disposed in a plurality of locations. For example, the elastic component 44 is disposed on a surface that is of the heat conduction block 42 and that is opposite to the edge folding section 102. For another example, the elastic component 44 is disposed on a side surface of the heat conduction block 42. The elastic component 44 may be a spring, or may be a spring plate or another structure. A structure of the elastic component is not limited herein, and any structure falls within the protection scope of this application.

When the heat conduction block 42 and the elastic component 44 shown in FIG. 9 are used as the heat conduction module 4, to ensure that the heat conduction block 42 move smoothly in the first direction, a guide structure is further included. The guide structure is configured to guide a moving path of the heat conduction block 42, and a guide direction is consistent with the first direction.

Figure 10:
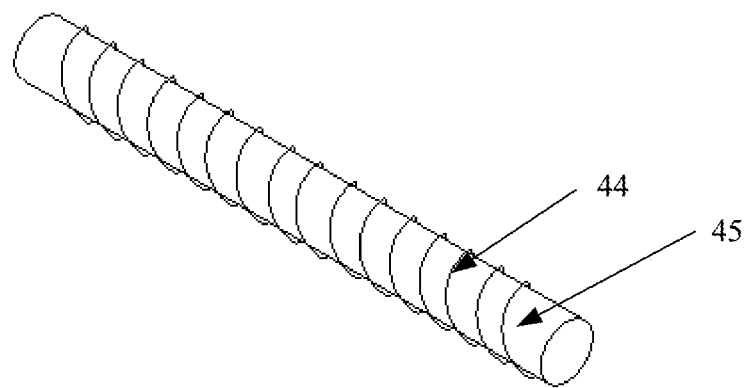
FIG. 10 is a schematic diagram of a connection relationship between an elastic component and a guide post according to some embodiments of this application.

A structure of the guide structure may be as follows: As shown in FIG. 10, the guide structure includes a guide post 45, an extension direction of the guide post 45 is consistent with the first direction, and one end of the guide post 45 is connected to the edge folding section. If the elastic component 44 is a spring, the spring may be disposed on the guide post 45. In addition, the guide structure may further include a guide block connected to the edge folding section 102, and a guide groove that is disposed on the heat conduction block and that cooperates with the guide block, where extension directions of the guide block and the guide groove both are consistent with the first direction.

When the first heat conduction block 46 and the second heat conduction block 47 shown in FIG. 11 are used as the heat conduction module 4, a structure in which the first heat conduction block 46 and the second heat conduction block 47 slide relative to each other may be implemented by using a sliding track and a sliding groove that cooperate with each other. For example, the sliding track is disposed on the first heat conduction block 46, and the sliding groove is disposed on the second heat conduction block 47; or the sliding track is disposed on the second heat conduction block 47, and the sliding groove is disposed on the first heat conduction block 46.

Figure 12:
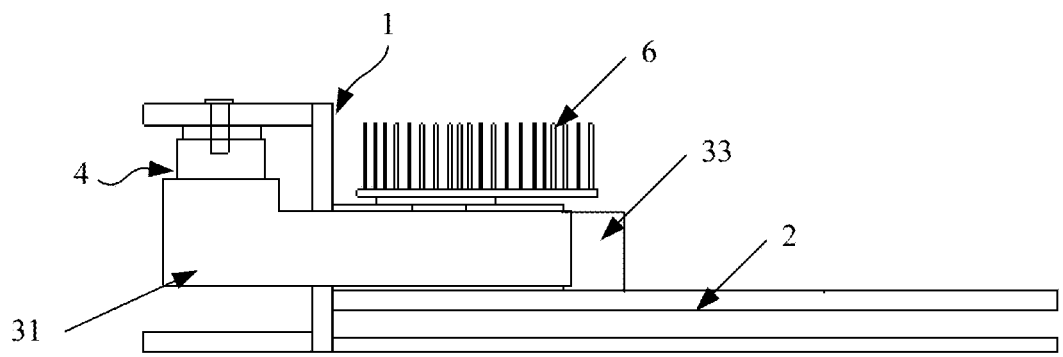
FIG. 12 is a schematic diagram of a structure of a communications device according to some embodiments of this application.
Figure 13:
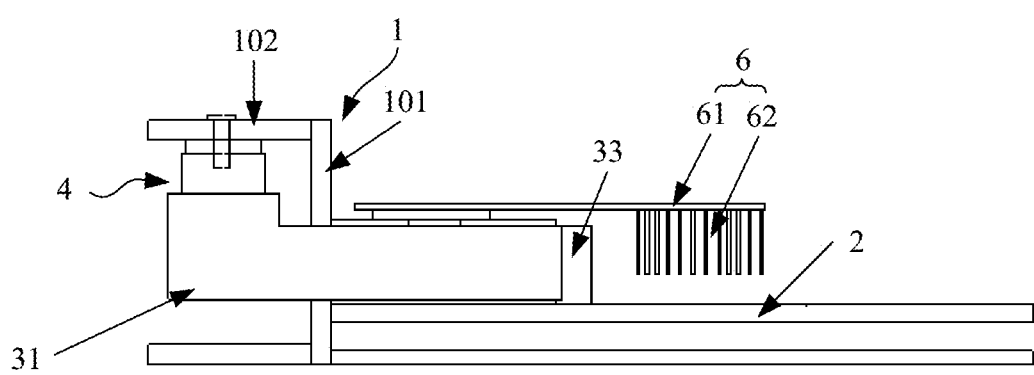
FIG. 13 is a schematic diagram of a structure of a communications device according to some embodiments of this application.

To further improve an effect of heat dissipation on the optical module, referring to FIG. 12 and FIG. 13, the heat dissipation structure further includes a heat dissipating device 6 configured to dissipate heat from the optical module 31. The heat dissipating device 6 and the PCB board 2 are located on a same side. In this way, heat is dissipated from the optical module 31 by using the heat dissipating device 6, and the heat is dissipated from the optical module 31 by using the heat conduction module 4 and the panel 1, to implement multi-directional heat dissipation on the optical module, thereby further improving heat dissipation efficiency.

The heat dissipating device 6 has a plurality of implementable structures. The following describes a structure of the heat dissipating device 6 by using two embodiments.

Embodiment 1: As shown in FIG. 12, the heat dissipating device includes a heat dissipation fin and a heat conduction plate, and the heat dissipation fin is located above the optical module. Generally, a heat dissipation hole is disposed in the optical cage. To enable the heat conduction plate to be in contact with the optical module 31, the heat conduction plate has a boss, and the boss passes through the heat dissipation hole to be in contact with a surface of the optical module.

Embodiment 2: As shown in FIG. 13, the heat dissipating device 6 includes a heat dissipation fin 62 and a second heat conduction module 61. The heat dissipation fin 62 is located on a side that is of the optical module 31 and that is away from the panel 1, one end of the second heat conduction module 61 is in contact with the optical module 31, and the other end of the second heat conduction module 61 is connected to the heat dissipation fin 62.

Heat emitted from the optical module 31 is conducted to the heat dissipation fin 62 by using the second heat conduction module 61 in contact with the optical module 31, and the heat is dissipated by using the heat dissipation fin 62, to dissipate heat from the optical module. In addition, the heat dissipation fin 62 is located on the side that is of the optical module 31 and that is away from the panel 1, that is, located on the outside of the electrical interface end of the optical module. In this way, space of the communications device in the direction H is not occupied, so that a height size of the entire panel is not increased while an effect of heat dissipation on the optical module is ensured.

The second heat conduction module 61 has a plurality of structures. For example, the second heat conduction module 61 includes a heat conduction substrate. One end of the heat conduction substrate is in contact with the optical module, and the other end of the heat conduction substrate is connected to the heat dissipation fin. For another example, to further improve heat conduction efficiency, in addition to the heat conduction substrate, a heat pipe is further included. The heat pipe is disposed in the heat conduction substrate, an evaporating end of the heat pipe is close to the optical module, and a condensing end is close to the heat dissipation fin.

The following verifies, by using experimental data, technical effects achieved by the heat dissipation structure for the optical module provided in the embodiments of this application.

In a first type of test background, heat is dissipated from four types of optical modules by using a heat dissipation structure that includes only the heat dissipating device 6 and does not include the heat conduction module 4, as shown in FIG. 12, and ambient temperature during test is 50° C.

In a second type of test background, heat is dissipated from four types of optical modules with a same specification by using a heat dissipation structure that includes both the heat dissipating device 6 and the heat conduction module 4, as shown in FIG. 12, and ambient temperature during test is also 50° C.

In addition, test locations in the optical modules are the same.

| No. | First type of heat dissipation structure | Second type of heat dissipation structure |
| --- | --- | --- |
| First optical module | 47.2° C. | 41.4° C. |
| Second optical module | 49.6° C. | 43.4° C. |
| Third optical module | 50.6° C. | 45° C. |
| Fourth optical module | 49.4° C. | 43.6° C. |

The following may be learned from the foregoing data:

When the first type of heat dissipation structure that includes only the heat dissipating device 6 and does not include the heat conduction module 4 is used to test the first optical module, test temperature of the first optical module is 47.2° C.; when the second optical module is tested, test temperature of the second optical module is 49.6° C.; when the third optical module is tested, test temperature of the third optical module is 50.6° C.; and when the fourth optical module is tested, test temperature of the fourth optical module is 49.4° C.

However, when the second type of heat dissipation structure that includes both the heat dissipating device 6 and the heat conduction module 4 is used to test the first optical module, the test temperature of the first optical module decreases to 41.4° C.; when the second optical module is tested, the test temperature of the second optical module decreases to 43.4° C.; when the third optical module is tested, the test temperature of the third optical module decreases to 45° C.; and when the fourth optical module is tested, the test temperature of the fourth optical module decreases to 43.6° C.

Therefore, it may be clearly learned from the foregoing experimental data that, a heat dissipation effect is better when heat is dissipated from the optical module by using the heat dissipation structure including the heat dissipating device 6 and the heat conduction module 4.

In the descriptions of this specification, the specific features, structures, materials, or characteristics may be combined in a proper manner in any one or more of embodiments or examples.

The foregoing descriptions are merely embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A heat dissipation structure for an optical module, comprising:
    a panel with a jack;
    a printed circuit board (PCB), disposed on one side of the panel, wherein the PCB is configured to receive the optical module installed thereon; and
    a heat conduction module, configured to conduct heat emitted from the optical module to the panel, wherein one end of the heat conduction module is in contact with the optical module, and the other end of the heat conduction module is in contact with the panel.

2. The heat dissipation structure according to claim 1,
    wherein the panel has a plug-in section and an edge folding section connected to the plug-in section, and the jack is disposed on the plug-in section;
    wherein the edge folding section is located on a first side of the plug-in section, the PCB is located on a second side of the plug-in section, and the first side is opposite to the second side; and
    wherein one end of the heat conduction module is in contact with the edge folding section, and the other end of the heat conduction module is in contact with a part that is of the optical module and that is located on a first side.

3. The heat dissipation structure according to claim 2, wherein a surface that is of the optical module and that is opposite to the edge folding section is a heat conduction surface, and the heat conduction module is disposed between the heat conduction surface and the edge folding section.

4. The heat dissipation structure according to claim 2, wherein the heat conduction module is connected to the edge folding section and can float in a first direction, and the first direction is a direction perpendicular to a plug-in direction of the optical module.

5. The heat dissipation structure according to claim 4, wherein the heat conduction module comprises an elastic heat conduction pad.

6. The heat dissipation structure according to claim 5, wherein the heat conduction module further comprises:
    a heat conduction block, wherein the heat conduction block has a rigid structure, wherein the elastic heat conduction pad is disposed between the heat conduction block and the optical module, and/or between the heat conduction block and the edge folding section; and
    a connecting piece, wherein the connection piece connects the heat conduction block and the elastic heat conduction pad to the edge folding section.

7. The heat dissipation structure according to claim 4, wherein the heat conduction module comprises:
    a heat conduction block, wherein the heat conduction block has a rigid structure; and
    an elastic component, wherein the elastic component connects the heat conduction block to the edge folding section, and is configured to apply elastic force to the heat conduction block, so that the heat conduction block floats in the first direction.

8. The heat dissipation structure according to claim 1,
    wherein the panel has a plug-in section and an edge folding section connected to the plug-in section, and the jack is disposed on the plug-in section;
    wherein the edge folding section and the PCB board are located on a same side of the plug-in section; and
    wherein one end of the heat conduction module is in contact with the edge folding section, and the other end of the heat conduction module is in contact with a part that is of the optical module and that is located on a same side as the edge folding section.

9. The heat dissipation structure according to claim 8, wherein a surface that is of the optical module and that is opposite to the edge folding section is a heat conduction surface, and the heat conduction module is disposed between the heat conduction surface and the edge folding section.

10. The heat dissipation structure according to claim 1, wherein an auxiliary heat dissipation component is further disposed on the panel, and the auxiliary heat dissipation component is configured to diffuse heat conducted to the panel.

11. The heat dissipation structure according to claim 10, wherein the auxiliary heat dissipation component comprises:
    a heat pipe disposed in the panel, wherein the heat pipe has an evaporating end and a condensing end that are opposite to each other, with the evaporating end being closer to the heat conduction module than the condensing end.

12. A communications device, comprising:
    a heat dissipation structure for an optical module, wherein the heat dissipation structure for optical module comprises:
    a panel with a jack;
    a printed circuit board (PCB) disposed on one side of the panel, wherein the PCB is configured to receive the optical module installed thereon, wherein the optical module passes through the jack to connect to a socket disposed on the PCB; and
    a heat conduction module, configured to conduct heat emitted from the optical module to the panel, wherein one end of the heat conduction module is in contact with the optical module, and the other end of the heat conduction module is in contact with the panel.

13. The communications device according to claim 12,
    wherein the panel has a plug-in section and an edge folding section connected to the plug-in section, and the jack is disposed on the plug-in section;
    wherein the edge folding section is located on a first side of the plug-in section, the PCB is located on a second side of the plug-in section, and the first side is opposite to the second side; and
    wherein one end of the heat conduction module is in contact with the edge folding section, and the other end of the heat conduction module is in contact with a part that is of the optical module and that is located on a first side.

14. The communications device according to claim 13, wherein the heat conduction module is connected to the edge folding section and can float in a first direction, and the first direction is a direction perpendicular to a plug-in direction of the optical module.

15. The heat dissipation structure according to claim 14, wherein the heat conduction module comprises an elastic heat conduction pad.

16. The communications device according to claim 15, wherein the heat conduction module further comprises:

a heat conduction block, wherein the heat conduction block has a rigid structure, wherein the elastic heat conduction pad is disposed between the heat conduction block and the optical module, and/or between the heat conduction block and the edge folding section; and
a connecting piece, wherein the connection piece connects the heat conduction block and the elastic heat conduction pad to the edge folding section.

17. The communications device according to claim 14, wherein the heat conduction module comprises:
a heat conduction block, wherein the heat conduction block has a rigid structure; and
an elastic component, wherein the elastic component connects the heat conduction block to the edge folding section, and is configured to apply elastic force to the heat conduction block, so that the heat conduction block floats in the first direction.

18. The communications device according to claim 12, wherein the panel has a plug-in section and an edge folding section connected to the plug-in section, and the jack is disposed on the plug-in section;
wherein the edge folding section and the PCB board are located on a same side of the plug-in section; and
wherein one end of the heat conduction module is in contact with the edge folding section, and the other end of the heat conduction module is in contact with a part that is of the optical module and that is located on a same side as the edge folding section.

19. The communications device according to claim 13, wherein a surface that is of the optical module and that is opposite to the edge folding section is a heat conduction surface, and the heat conduction module is disposed between the heat conduction surface and the edge folding section.

20. The communications device according to claim 18, wherein a surface that is of the optical module and that is opposite to the edge folding section is a heat conduction surface, and the heat conduction module is disposed between the heat conduction surface and the edge folding section.

\* \* \* \* \*